May 26, 1925.

T. C. ROBERTS

SPRING MOTOR

Filed May 5, 1921

Inventor.
Theodore C. Roberts
By Ray B. Whitman
Attorney

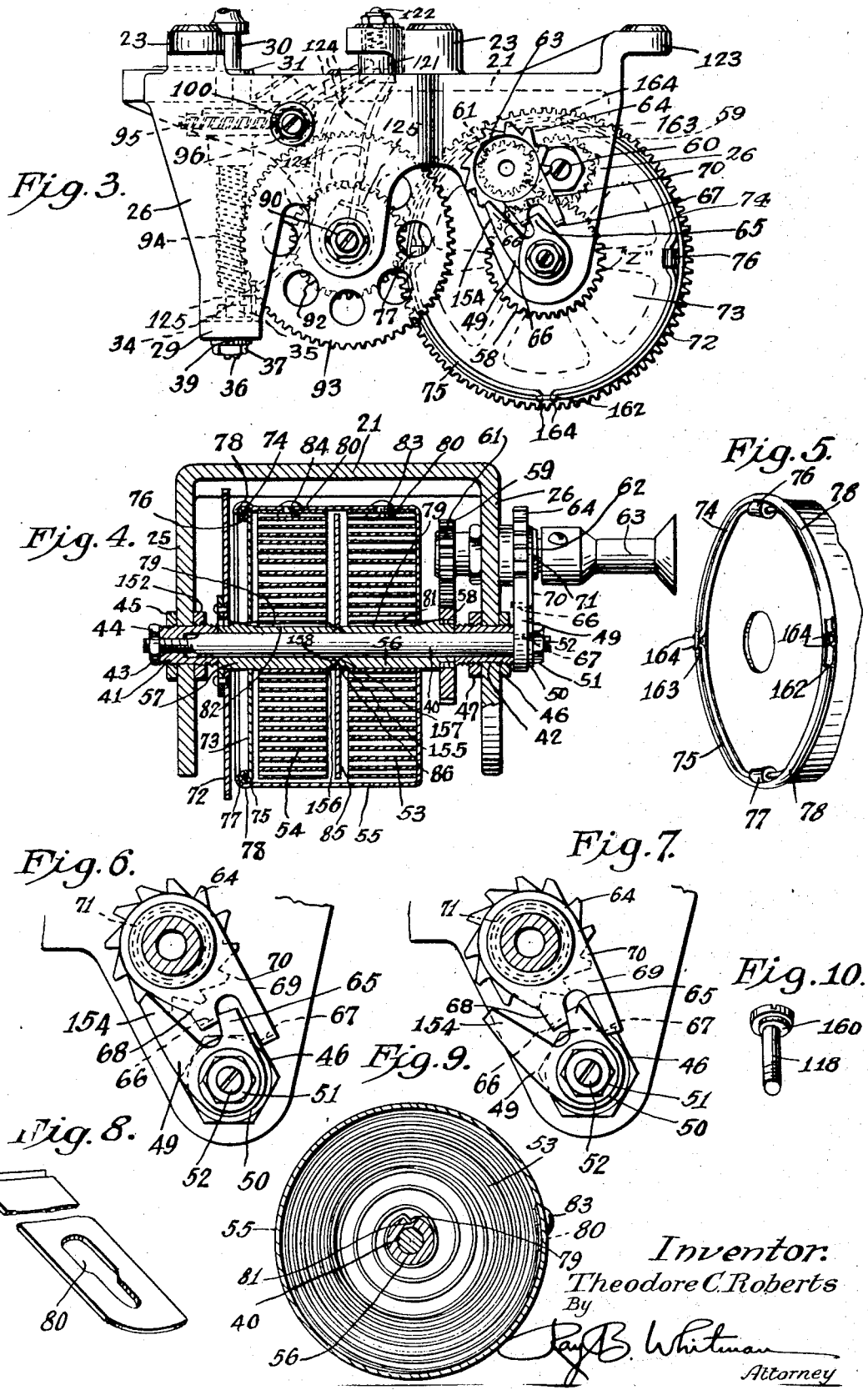

May 26, 1925.

T. C. ROBERTS

SPRING MOTOR

Filed May 5, 1921

Inventor
Theodore C. Roberts
By
Ray B. Whitman
Attorney

Patented May 26, 1925.

1,539,511

UNITED STATES PATENT OFFICE.

THEODORE C. ROBERTS, OF NEW YORK, N. Y., ASSIGNOR, BY MESNE ASSIGNMENTS, TO COLUMBIA PHONOGRAPH COMPANY, INC., A CORPORATION OF NEW YORK.

SPRING MOTOR.

Application filed May 5, 1921. Serial No. 467,113.

*To all whom it may concern:*

Be it known that I, THEODORE C. ROBERTS, a citizen of the United States, and a resident of the city of New York, county and State of New York, have invented certain new and useful Improvements in Spring Motors, of which the following, taken in connection with the accompanying drawings, is a specification.

This invention relates to improvements in spring motors, and while such improvements are capable of more or less general use, the present embodiment has been particularly conceived with reference to phonographic use, which requires certain features and refinements which may be desirable in other uses, but are not always essential. It will, therefore, be understood that in describing the invention adapted to such use, that all other uses to which it may be put are comprehended.

An object of the invention is to provide a motor capable of accurate regulation to constant speed, and to this end, the regulating means of the present embodiment includes a lever which is adapted to positively set the running speed of the motor to any desired amount, and at the same time is capable of the most minute adjustment, when it is desired to change the speed.

It is also an object to provide indicating means in connection with the regulating lever, and means for adjusting the relation between the functioning parts of the regulating lever and the indicating means, whereby the accuracy of the indicator may be maintained.

A further object is to provide a sheet-metal supporting plate for the motor, having improved strengthening and vibration eliminating means. The plate also has for its purpose the permanent and accurate positioning and alignment of the motor as a unit thereon; this greatly facilitates manufacture, assembly and shipping, and provides a product of greater durability.

Another object of the invention is to provide for precise and accurate adjustment of the motor parts, i. e.—shafts, gears, etc.; so that they may be perfectly aligned, thereby eliminating noise and wear due to improper meshing of gears, looseness, or other causes.

It is also an object to provide an improved gear arrangement which will be absolutely silent in operation, this being of prime importance in phonograph use, to avoid sound interference with the reproduction.

A still further object is the provision of an improved spring and spring barrel construction adapted to greatly simplify the assembly or disassembly of the motor, without the use of special tools and parts, and in which the possibility of spring breakage is reduced to a minimum. In particular, the springs, as here shown, are adapted to hook themselves into place automatically, should they become unhooked, and also this feature is utilized in the original assembly of the motor,—no attempt being made to hook them before the motor is first wound, the winding automatically causing the springs to hook at their ends. Further, irregular strains on the springs are absorbed by the peculiar form of flexible connection of the springs with the spring barrels.

The structure also has for its purpose the enabling of easy winding and a more uniform transmission of power.

Still another object of the invention is to provide an improved winding pawl which permits positive windng of the motor without noise.

A still further object consists in completely standardizing the parts, so that the same parts, with the exception of certain adapting parts,—such as the main motor casting and the spring supporting shaft,—may be similarly used in motors of different sizes—that is, in motors employing one, two, three, four or more springs, connected in series, the standardization being also such, that any of the several sizes of motors may be interchangeably mounted on the same motor board.

With the above and other objects in view, embodiments of this invention are shown in the accompanying drawings, and these embodiments will be hereinafter more fully described with reference thereto, and the invention will be finally pointed out in claims.

In the accompanying drawings—

Fig. 1 is a plan view showing part of the upper side of a phonograph cabinet, provided with a motor embodying the present invention, but with the turntable removed, its position being indicated by dot-and-dash lines.

Fig. 2 is a vertical sectional view, taken along the line 2—2 of Fig. 1, but showing the turntable in position, and omitting the tone-arm with its sound-reproducer.

Fig. 3 is a side elevation of the motor, shown detached from the motor plate.

Fig. 4 is a vertical sectional view of the motor taken along the line 4—4 of Fig. 1, and showing the same removed from the motor plate.

Fig. 5 is a perspective view of one end of the spring barrel, showing the closure head in place therein.

Figs. 6 and 7 are detail views of the silent pawl mechanism, shown in the normal or holding position of the pawl, and in its winding or disengaged position, respectively.

Fig. 8 is a perspective view, showing both ends of one of the power springs.

Fig. 9 is a vertical transverse sectional view of the spring barrel.

Fig. 10 is a detail perspective view of the eccentric regulating bolt, which serves as a bearing for the speed-regulating lever.

Figure 11:
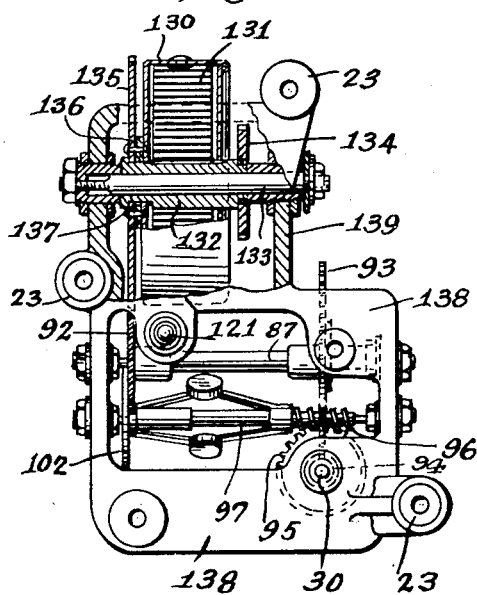

Figs. 11, 12, 13, and 14 are comparative plan views, partially in section, and showing the invention embodied in motors, employing respectively, one, two, three and four springs.

Similar reference characters indicate corresponding parts throughout the several figures of the drawings.

Referring to the drawings, and more particularly to Figs. 1 and 2 thereof, the phonograph cabinet is provided in its top board 10 with a rectangular opening 11 through which the motor depends, a sheet-metal motor plate 12, preferably formed of pressed steel, extending over the opening and being secured to the top board adjacent the opening by screws 13. The plate is provided along its edges with a down-turned right angle flange 14, the longitudinal edges being parallel, the rear end portion being shaped as at 15, to provide a mounting for the tone-arm, while at its forward end it is provided with portions 16 and 17 concentric to the turntable, the flange 14 being cut away adjacent these portions,—as at 18 and 19—to accommodate the ends of the manual start-and-stop lever and the speed-regulating lever, hereinafter more fully referred to. The plate has impressed along the portion adjacent the start-and-stop lever, the word "Start" and an arrow, and along the portion adjacent the speed-regulating lever, calibrations having the letters S and F at the ends.

The motor plate 12 is provided with heavy ribs 20 stamped therein in the form of a grid, which give it strength, rigidity, non-warping qualities, and the property of eliminating vibration. The shape of the plate makes it very convenient to pack and handle.

The motor carrying frame 21, preferably formed of cast metal, is secured to the under side of the motor plate by bolts and nuts 22 passing through raised brackets 23 formed in the frame, and suitably insulated from the plate by felt washers 24, (Fig. 2), the upper surface of the frame being substantially flat and spaced from the motor plate, as shown.

The frame is provided at its sides with opposed depending side portions 25 and 26 suitably reinforced, as at 27 and 28, by tapered enlargements to give the requisite strength and rigidity to prevent vibration. The side portion 26 is provided at its lower forward portion with a laterally extending shelf 29 projecting at right angles thereto, and adapted to support the bearing at the lower end of the vertical turntable shaft 30, the upper end of which extends through and is journaled in a flanged bushing 31 provided in the upper portion of the motor frame, and preferably formed of brass. The bearing at the lower end of the turntable shaft consists of a bushing 32, of a suitable bearing metal, rotatable in the portion 29, being flanged outwardly at its lower end, to engage the under surface of the portion 29, and flanged inwardly at its upper end, as at 33, to engage the reduced end 34 of the turntable shaft. The bushing is exteriorly screw-threaded at its upper end and is engaged by a nut 35 adapted to secure it in place. A hardened steel thrust-screw 36 is engaged in the lower end of the bushing 32, being adjustably locked in place by a nut 37 engaging the lower flanged end of the bushing, and provided with a small bearing head, or boss 38, upon which the end of the turn-table shaft rests. The bore of the bushing 32 is slightly eccentric, so that by turning it to the proper position of adjustment, the shaft may be accurately aligned; the flange at the outer end of the bushing being provided with a kerf 39, (Fig. 3), adapted to be engaged by a screw-driver for this purpose.

The horizontal spring-supporting shaft 40, (Fig. 4), upon which the spring elements are mounted, is non-rotatably supported at its ends in bushings 41 and 42 provided in the depending side portions 25 and 26 of the frame; the bushing 41 being shouldered interiorly, the greater diameter portion, inwardly of the shoulder, being unthreaded and engaged by the shaft, while the remaining portion is screw-threaded and engaged by the threaded reduced end 43 of the shaft, the projecting extremity of which is engaged by a nut 44. The bushing 41 is threaded exteriorly at its ends and is engaged by nuts 45 and 152 bearing upon each side of the frame portion 25. The bushing 42 is provided with a plain bore and exteriorly it is threaded at its ends and engaged by nuts 46 and 47 bearing upon the sides of the frame.

The shaft 40 extends beyond the bushing 42 and is shouldered, as at 48, to provide a support for the pawl 49, hereinafter more fully referred to, and held in place by a washer 50 and a nut 51 screwed upon the reduced threaded extremity 52 of the shaft.

In the present embodiment there is illustrated a two-spring motor, the two springs 53 and 54, (Fig. 4), being housed in a single spring barrel 55 freely rotatable about sleeves 56 and 57 rotatable upon the shaft 40, the springs being connected at their inner ends to the sleeves, and at their outer ends to the barrel. The sleeve 56 has a gear mounted upon its end and meshing with a pinion 59 journaled upon a stud provided at 60 upon the frame, the pinion 59 being, in turn, meshed by a pinion 61 provided upon the inner end of the winding shaft 62 journaled in the frame. Upon its outer end, the shaft 62 is provided with a funneled extension 63, having a threaded bore, which facilitates engagement by the winding crank 153, and being relatively near the escutcheon plate of the cabinet, allows a shorter and therefore relatively stronger winding crank to be used.

A ratchet 64, (Figs. 4, 6 and 7), is provided upon the winding shaft and co-operates with a silent pawl mechanism to permit silent winding and prevent reverse movement of the shaft. This mechanism comprises the pawl 49, heretofore referred to, mounted to freely rotate upon the end of the shaft 40, and having a relatively long projecting-tooth 154 adapted to engage the ratchet teeth, and a shorter projecting-tooth 65 extending between the inwardly bent ends 66 and 67 of arms 68 and 69 of a plate 70 mounted upon the winding shaft, plate 70 being frictionally held against the ratchet by a coiled spring 71.

In operation, the turning of the winding shaft in clockwise direction will cause the plate 70 to disengage the pawl from the ratchet, and hold it out of engagement during continuance of the winding, as shown in Fig. 6. Upon release of the winding shaft, the springs of the motor tend to move it in reverse direction, and through its frictional engagement with the ratchet, the plate 70 is correspondingly moved and returns the pawl into holding engagement with the ratchet teeth, as shown in Fig. 6, to arrest the reverse movement of the winding shaft.

The sleeve 57, (Fig. 4), has connected to its outer end a large spiral gear 72 actuated by the unwinding of the springs, to drive the turntable shaft through intermediate gearing, hereinafter more fully described.

The spring barrel 55, housing the springs 53 and 54, is cup-shaped, and at its open end is provided with a removable closure head 73 adapted to be held in place by spring-holding wires 74 and 75, (Fig. 5), clipped thereto by diametrically opposed over-turned lugs 76 and 77, and engaging an annular groove 78 formed at the open end of the barrel. Figs. 4 and 5 show the spring barrel turned 90 degrees from the position of Fig. 3. At diametrically opposite sides of the barrel the annular grooved portion 78 is provided with elongated slots 162 and 163, which are engaged by the outwardly bent ends 164 of the springs. The elongation of the slots relatively to the combined width of the ends, facilitates insertion of the ends and also permits of considerable tolerance of dimensions, which are of considerable manufacturing advantage. When not in position holding the head 73, the wires 74 and 75 spring toward a straight position, and may in fact be substantially straight in their disengaged untensioned position. This structure is such as to fix the position of the head to prevent its displacement either inwardly or outwardly, and the joint formed by the engagement of the springs with the groove will prevent the leakage of the lubricant provided in the barrel, and at the same time, the head may be removed by merely inserting a screw-driver, or the like, underneath the springs to release them from the groove.

The motor springs 53 and 54, as shown in Figs. 8 and 9, are provided at their inner ends each with a V-shaped hook 79, and at their outer ends each with a bayonet slot 80, the hooks of the respective springs adapted to engage the longitudinal slots 81 and 82 formed in the sleeves 56 and 57, while the bayonet slots are engaged by buttons 83 and 84 secured to the barrel. A spring-separating disc plate 85, having its center hole 86 engaging the joint between the sleeves, is disposed between the springs, the sleeves being beveled at their adjacent ends,—as at 155 and 156,—thereby forming an annular channel in which the disc plate 85 has its bearing, and which maintains the disc plate in a normal plane of rotation and prevents its longitudinal displacement. Slightly convex bevels 157 and 158 are formed interiorly at the adjacent ends of the sleeves, so that there is substantially line contact between the ends of the sleeves, thus permitting a limited amount of lubricant to flow between the shaft 40 and the sleeves, without clogging.

The spring structure is such that if the springs become unhooked they will hook again automatically, and in fact they are initially assembled without attempting to hook them. The V-shaped hook 79 at the inner end of the springs will prevent the production of any irregular strains, such as might be produced when rivets are used, and tight winding of the spring will only tend to hold it tighter.

A longitudinal intermediate drive-shaft 87, (Fig. 2), has its reduced ends 88 and 89 journaled in eccentric bushings 90 and 91 of similar construction to the eccentric bushing at the lower end of the turntable shaft, and adapted to permit of accurate adjustment and alignment of the shaft. Upon the shaft 87 there is provided near one end, a relatively small spiral gear 92 meshing with the driving gear 72, and near the other end, a relatively large spiral gear 93, (Fig. 3), meshing with the worm portion 94 of the turntable shaft 30.

Above the worm portion 94, the turntable shaft 30 is provided with a spiral gear 95 meshing with the worm 96 of the horizontal governor shaft 97, the latter having its reduced ends 98 and 99 journaled in adjustable eccentric bushings 100 and 101 provided in the sides of the frame 21, these bushings being of similar construction to the adjustable eccentric bearings referred to above.

Governor shaft 97 is provided, at one end, with a disc 102, (Figs. 1 and 2), having its hub 103 slidable on the shaft, and to which bowed leaf springs 104 are connected at their outer ends, the inner ends being connected to a stationary collar 105 fixed upon the shaft, centrifugal weights 106 being secured to the springs intermediate their ends. The governor parts are relatively light, so that there is very little vibration, noise, and danger of disarrangement in shipping.

A combined brake and speed-regulating lever 107 is pivotally mounted upon the frame at 108, and provided with a brake pad 109 adapted, when moved to the left, Fig. 1, to engage the governor disc to stop the motor, and when moved to the right, to limit the position of the disc—depending, of course, on its position of adjustment—and thereby regulate the speed of the motor.

Lever 107 is provided with an eccentric flange portion 110 for co-operation with the start-and-stop lever 111 and the speed-regulating lever 117. Lever 111 is pivotally mounted at 112 upon the motor plate 12, has its long arm extending through the cut-out 18 in the edge of the motor plate, and is provided with a knob 113 disposed over the word "Start" inscribed on the plate. Upon the end of the short arm of lever 111, there is pivotally mounted a spring pawl 114, provided at its inner end with a lug 115, (Fig. 2), yieldably held against the edge of lever 111 by a spring 116, the outer end being projected toward the flange 110 of the brake lever. By moving the lever 111 to the left (Fig. 1), the pawl 114 engages the flange 110 and moves the brake lever to braking position, the yieldable movement of the pawl preventing excessive pressure on the brake pad, and the possibility of any damage that might result therefrom.

The speed-regulating lever 117 is adjustably and pivotally mounted upon the frame by means of a bolt 118, (see Fig. 10), adapted to be adjustably fixed in position by a nut 159 at its threaded end engaging the under side of the motor frame and having an eccentric bearing shoulder 160 upon which the lever 117 is journaled. The lever is provided with an eccentric projection 119 at the end of its short arm; and at the end of its long arm, which extends through the cut-out 19 of the motor plate, there is provided an index pointer 120 which is bent about the edge of the motor plate above the scale markings. If the speed of the motor is not exactly, at say 80 revolutions per minute, with the pointer 120 at the center of the scale markings, it can be adjusted by turning the eccentric bolt, accessible through the opening 161 of the motor plate, without removing the motor from the cabinet. As the brake lever 107 is released by the start-and-stop lever 111, it is moved by the pressure of the governor disc until the eccentric flange 110 engages the projection 119 of the speed-regulating lever 117; this point of engagement is varied by adjustment of said lever, to limit the movement of the brake lever 107, and thereby adjust the speed of the motor, as described above.

In order to conveniently lubricate the entire motor mechanism, there is provided a complete oiling system, made accessible by the removal of the turntable. This includes an oil cup 121 mounted upon the motor frame, and having a spring-pressed ball closure 122 therein; the oil cup being disposed within an opening 123 of the motor plate. A plurality of oil-distributing tubes 124 are connected to the oil cup, and oil is adapted to flow, by gravity, through the tubes to the shaft bearings at the respective ends of the intermediate drive-shaft 87, the governor shaft 97, and the lower end of the turntable shaft 30; angle brackets 125 are connected to the respective bearings by the holding nuts thereof, and support the ends of the tubes. The upper bearing 31 of the turntable shaft is adapted to be lubricated by injecting oil through an aperture 126 in the motor plate into an oil pocket 127 formed in the motor frame and having one end in communication with the bearing. The oiling system is such that the tubes may be easily cleaned by running a small wire up through them.

In Figs. 11 to 14 there are illustrated four embodiments of the invention adapted, respectively, to motors employing one, two, three and four springs.

Fig. 11 illustrates a single spring motor in which the spring barrel 130 is of such length as to accommodate a single coil spring 131, being rotatable about a sleeve 132, one end of the spring being connected to the spring barrel, and the other end to the sleeve, the sleeve being rotatably mounted upon a stationary shaft 133. The sleeve is provided at one end with a gear 134 corresponding to the gear 58 of the first described embodiment, and co-operating with the winding mechanism in a similar manner; while the driving gear 135, corresponding to the driving gear 72 of the first described embodiment, is directly connected to the spring barrel by bolts 136, a spacing disc 137 being disposed therebetween. The motor frame casting 138 corresponds to the motor frame 21, (Fig. 4), of the previously described embodiment, with the exception that the right hand rear portion 139 supporting one end of the shaft 133, is disposed inwardly and relatively close to the spring barrel so as to form a rigid support for shaft 133.

Figure 12:
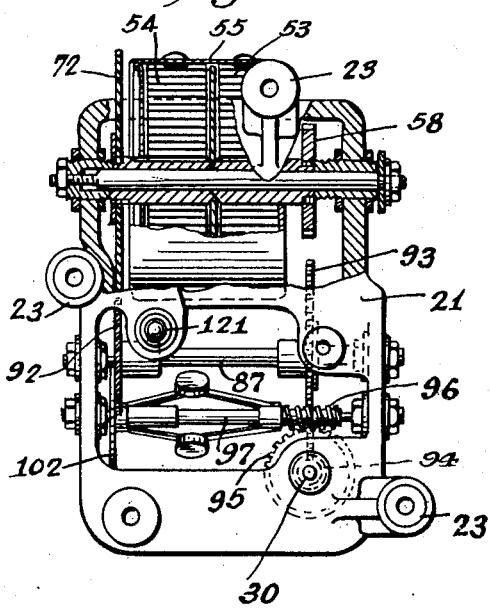

Fig. 12 illustrates the two-spring type of motor, and corresponds to the first described embodiment, but is here shown for comparative purposes, with the other types, in plan view. Comparing Figs. 11 and 12, therefore, it will be noted that the castings differ to accommodate the different length spring barrels of the supporting shafts, and to substantially support the respective lengths of the supporting shafts, and that two types of spring barrels are employed, viz, the smaller barrel for accommodating a single spring, and a larger barrel for accommodating two springs, the spring units being the same in each case.

Figure 13:
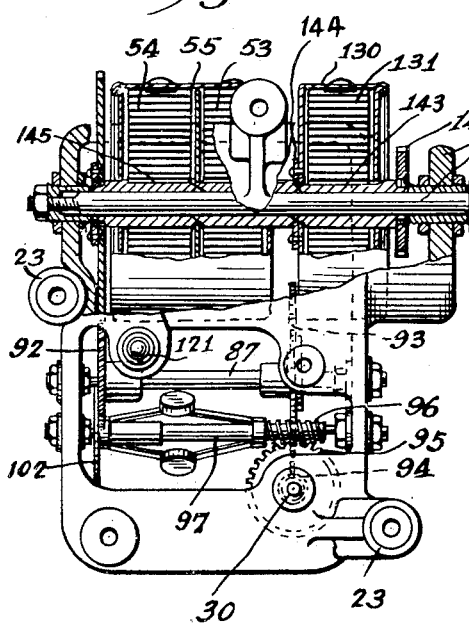

In Fig. 13 there is illustrated the three-spring type of motor, in which the frame has its rear right-hand side-portion extended outwardly, as at 140, to accommodate the lengthened shaft 141, having mounted thereon one large spring barrel 55 with its two springs 53 and 54, and one small barrel 130 provided with a spring 131; these parts being standard and adapted to be employed interchangeably in the one and two spring types, as well. In winding the three-spring type, the winding gear 142, connected to the sleeve 143, winds the spring 131 from its inner end, and when it is sufficiently tight, the spring barrel is turned, and, being connected to the sleeve 144, winds the spring 53 from its inner end. When this spring is sufficiently tight, the barrel 55 is turned, and the spring 54 is wound from its outer end; the sleeve 145 at the inner end of the spring 54 being held stationary, through its connection with the driving gear. It will be understood that when the motor is running, the unwinding of the springs takes place in the reverse order.

Figure 14:
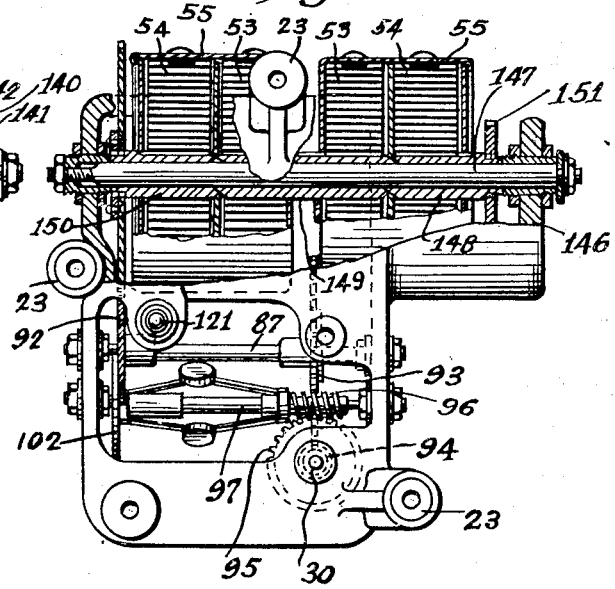

In Fig. 14 there is illustrated the four-spring type of motor, in which the right-hand rear portion 146 of the motor frame is still farther extended—over that shown in Fig. 13—to accommodate the end of the shaft 147,—also increased in length,—and two large size spring barrels 55, each provided with two springs 53 and 54, are mounted upon sleeves 148, 149, and 150, to which the inner ends of the springs are connected. The sleeve 148 has the winding gear 151 connected to its outer end; the sleeve 150 has the driving gear connected to its outer end; and the sleeve 149, of double length, is connected to the inner ends of the two adjacent intermediate springs 53. In winding this type of motor, the turning of the sleeve 148, through the winding gear, tightens the spring 54 from its inner end; this turns the right-hand barrel 55 and tightens the spring 53 from its outer end, which spring, when sufficiently tight, turns the sleeve 149. This tightens the next spring 53 from its inner end, thereupon turning the left-hand barrel and tightening the spring 54 from its outer end; the sleeve 150 meanwhile being held stationary, through its connection with the driving gear.

It will be noted that the invention makes possible a complete standardization of parts, only two types of spring barrels being necessary for construction of motors of any size; it being understood, of course, that if motors, employing a greater number of springs, should be desired, it would only be necessary to increase the size of the casting at the portion for supporting the spring shaft. The three supporting brackets 23 occupy corresponding positions, with reference to each other, upon all the sizes of castings, so that the motors of different sizes may be interchangeably connected to the same motor plate.

While there is illustrated and described preferred and satisfactory embodiments of this invention, it is obvious that changes may be made therein which come within the spirit and scope of the appended claims.

Having now described the invention, what is claimed as new and for which Letters Patent of the United States is desired, is:

1. The combination in a motor, of a frame having a base and projecting side portions, a horizontal spring shaft supported by the side portions, power spring means supported upon the spring shaft, a gear journaled upon the spring shaft adapted to be driven by the spring means, a vertical shaft journaled in the frame, a horizontal intermediate shaft journaled in the frame between the spring shaft and the vertical shaft, the gear on the intermediate shaft meshing with the spring-driven gear, worm gears between the intermediate shaft and the vertical shaft, and a governor geared to the vertical shaft.

2. The combination in a motor, of a frame having a base and projecting side portions, a horizontal spring shaft supported by the side portions, power spring means supported upon the spring shaft, a worm gear journaled upon the spring shaft adapted to be driven by the spring means, a vertical shaft journaled in the frame, a horizontal intermediate shaft journaled in the frame between the spring shaft and the vertical shaft, the worm gear on the intermediate shaft meshing with the spring-driven worm gear, worm gears between the intermediate shaft and the vertical shaft, and a governor geared to the vertical shaft.

3. The combination in a motor, of a frame having a base and projecting side portions, a horizontal spring shaft supported by the side portions, power spring means supported upon the spring shaft, a relatively large worm gear journaled upon the spring shaft adapted to be driven by the spring means, a vertical shaft journaled in the frame, a horizontal intermediate shaft journaled in the frame between the spring shaft and the vertical shaft, a relatively small gear on the intermediate shaft meshing with the spring-driven worm gear, a worm gear on the intermediate shaft relatively larger than the last-mentioned gear, a worm on the vertical shaft meshing with the relatively larger gear, and a governor geared to the vertical shaft.

4. The combination in a motor, of a frame having a base and projecting side portions, a horizontal spring shaft supported by the side portions, power spring means supported upon the spring shaft, a relatively large worm gear journaled upon the spring shaft adapted to be driven by the spring means, a vertical shaft journaled in the frame, a horizontal intermediate shaft journaled in the frame between the spring shaft and the vertical shaft, a relatively small gear on the intermediate shaft meshing with the spring-driven worm gear, a worm gear on the intermediate shaft relatively larger than the last-mentioned gear, a worm on the vertical shaft meshing with the relatively larger gear, a worm gear mounted upon the vertical shaft, a horizontal governor shaft journaled in the frame, and a worm on the governor shaft meshing with the worm gear on the vertical shaft.

5. The combination in a motor, of a frame having a base and projecting side portions, a horizontal spring shaft supported by the side portions, power spring means supported upon the spring shaft, a gear journaled upon the spring shaft adapted to be driven by the spring means, a vertical shaft journaled in the frame, a horizontal intermediate shaft journaled in the frame between the spring shaft and the vertical shaft, a gear on the intermediate shaft meshing with the spring-driven gear, gearing between the intermediate shaft and the vertical shaft, and a horizontal governor shaft journaled in the frame between the vertical shaft and the horizontal spring shaft.

6. The combination in a motor, of a frame having a base and projecting side portions, and a lateral extension of one of the side portions in spaced parallel relation to the base, a horizontal spring shaft supported by the side portions, power spring means supported upon the spring shaft, a vertical shaft journaled in the base and in the lateral extension, gearing disposed between the horizontal spring shaft and the vertical shaft adapted to drive the vertical shaft, and governor means located between the spring shaft and the vertical shaft for controlling the speed of the motor.

7. The combination in a motor, of a frame having a base and projecting side portions, a horizontal spring shaft supported by the side portions, power spring means supported upon the spring shaft, a gear journaled upon the spring shaft adapted to be driven by the spring means, a vertical shaft journaled in the frame, gearing disposed between the vertical shaft and the spring-driven gear, means for axially adjusting the vertical shaft to the gearing, and a governor adapted to control the speed of the motor.

8. The combination in a motor, of a frame having a base and projecting side portions, a horizontal spring shaft supported by the side portions, power spring means supported upon the spring shaft, a gear journaled upon the spring shaft adapted to be driven by the spring means, a vertical shaft journaled in the frame, gearing disposed between the vertical shaft and the spring-driven gear, an eccentric adjustable bearing for axially adjusting the vertical shaft to the gearing, and a governor adapted to control the speed of the motor.

9. The combination in a motor, of a frame having a base and projecting side portions, a horizontal spring shaft supported by the side portions, power spring means supported upon the spring shaft, a gear journaled upon the spring shaft adapted to be driven by the spring means, a vertical shaft, a concentric bearing mounted in the base of the frame and journaling the upper end of the vertical shaft, an adjustable eccentric bearing mounted in the frame and journaling the lower end of the vertical shaft and adjusting the same, gearing disposed between the vertical shaft and the spring-driven gear, and a governor adapted to control the speed of the motor.

10. The combination in a motor, of a frame having a base and projecting side portions, a horizontal spring shaft supported by the side portions, power spring means supported upon the spring shaft, a gear journaled upon the spring shaft adapted to be driven by the spring means, a vertical shaft journaled in the frame, a horizontal intermediate shaft journaled in the frame between the spring shaft and the vertical shaft, a gear on the intermediate shaft meshing with the spring-driven gear, gearing between the intermediate shaft and the vertical shaft, a governor adapted to control the speed of the motor, and means for adjusting the intermediate shaft transversely of its axis.

11. The combination in a motor, of a frame having a base and projecting side portions, a horizontal spring shaft supported by the side portions, power spring means supported upon the spring shaft, a gear journaled upon the spring shaft adapted to be driven by the spring means, a vertical shaft journaled in the frame, a horizontal intermediate shaft journaled in the frame between the spring shaft and the vertical shaft, a gear on the intermediate shaft meshing with the spring-driven gear, gearing between the intermediate shaft and the vertical shaft, a governor adapted to control the speed of the motor, and an adjustable eccentric bearing supporting the ends of the intermediate shaft and adapted to permit adjustment of the intermediate shaft transversely of its axis.

12. The combination in a motor, of a frame having a base and projecting side portions, a horizontal spring shaft supported by the side portions, power spring means supported upon the spring shaft, a gear journaled upon the spring shaft adapted to be driven by the spring means, a vertical shaft journaled in the frame, gearing disposed between the vertical shaft and the spring-driven gear, a governor means geared to the vertical shaft and including a horizontal governor shaft, and means for adjusting the horizontal governor shaft transversely of its axis.

13. The combination in a motor, of a frame having a base and projecting side portions, a horizontal spring shaft supported by the side portions, power spring means supported upon the spring shaft, a gear journaled upon the spring shaft adapted to be driven by the spring means, a vertical shaft journaled in the frame, gearing disposed between the vertical shaft and the spring-driven gear, a governor means geared to the vertical shaft and including a horizontal governor shaft, and adjustable eccentric bearings journaling the governor shaft and adapted to permit adjustment transversely of its axis.

14. The combination in a motor, of a frame having a base and projecting side portions, a horizontal spring shaft supported by the side portions, power spring means supported upon the spring shaft, a gear journaled upon the spring shaft and adapted to be driven by the spring means, a vertical shaft journaled in the frame, a horizontal intermediate shaft journaled in the frame between the spring shaft and the vertical shaft, a horizontal governor shaft journaled in the frame, gears cooperating with the shafts to communicate movement from the spring-driven gear to the intermediate shaft, the governor shaft, and the vertical shaft, the axes of the intermediate shaft, the governor shaft, and the vertical shaft being non-intersecting, and independent removable bearings journaling the respective intermediate, governor, and vertical shafts.

15. The combination in a motor, of a frame having a base and projecting side portions, a horizontal spring shaft supported by the side portions, power spring means supported upon the spring shaft, a gear journaled upon the spring shaft and adapted to be driven by the spring means, a vertical shaft journaled in the frame, a horizontal intermediate shaft journaled in the frame between the spring shaft and the vertical shaft, a horizontal governor shaft journaled in the frame, gears cooperating with the shafts to communicate movement from the spring-driven gear to the intermediate shaft, the governor shaft, and the vertical shaft, the axes of the intermediate shaft, the governor shaft, and the vertical shaft being non-intersecting, and independent adjustable removable bearings journaling the respective intermediate, governor, and vertical shafts.

16. The combination in a motor, of a frame having a base and projecting side portions, a horizontal spring shaft supported by the side portions, power spring means supported upon the spring shaft, a gear journaled upon the spring shaft and adapted to be driven by the spring means, a vertical shaft journaled in the frame, a horizontal intermediate shaft journaled in the frame between the spring shaft and the vertical shaft, a horizontal governor shaft journaled in the frame, gears cooperating with the shafts to communicate movement from the spring-driven gear to the intermediate shaft, the governor shaft, and the vertical shaft, the axes of the intermediate shaft, the governor shaft, and the vertical shaft being non-intersecting, and independent removable eccentric bushings journaling the respective intermediate, governor, and vertical shafts, and adapted to permit adjustment of said shafts transversely of their axes.

17. The combination in a motor, of a frame having a base and projecting side portions, a horizontal spring shaft supported by the side portions, power spring means supported upon the spring shaft, a gear journaled upon the spring shaft adapted to be driven by the spring means, a vertical shaft journaled in the frame, a horizontal intermediate shaft journaled in the frame between the spring shaft and the vertical shaft, a governor shaft journaled in the frame, gears cooperating with the shafts to transmit movement from the spring-driven gear to the respective intermediate shaft, governor shaft and vertical shaft, an oil reservoir, and oil conduits adapted to distribute oil from the reservoir to the several bearings of the respective intermediate, governor, and vertical shafts.

18. In a motor, including a frame and a plurality of shafts journaled therein, bearings for the shafts, an oil reservoir, oil conduits adapted to distribute oil to the several bearings of the shafts, and means secured to the bearings adapted to maintain the position of the outlet ends of the conduits in proximity to the bearings.

19. The combination in a motor, including a frame and a plurality of shafts journaled therein, removable bearings for the shafts, retaining nuts for the bearings, an oil reservoir, oil conduits adapted to distribute oil to the several bearings, and supporting means for the outlet ends of the conduits secured to the bearings by said retaining nuts, and adapted to position the outlet ends in proximity to the bearings.

20. The combination in a motor, of a frame having a base and projecting side portions, a non-rotatable horizontal spring shaft supported by the side portions, a pair of removable bushings in the side portions one for each end of the spring shaft permitting disengagement of the shaft from the side portions longitudinally of its axis, a tubular spring arbor mounted upon the shaft, a spring barrel, a coil spring connected at its ends to the arbor and the barrel, winding means for the spring, and means adapted to be driven by the unwinding of the spring, the spring arbor, the spring barrel, and the coil spring being removable as a unit upon disengagement of the horizontal spring shaft.

21. In a motor, a spring arbor, a spring barrel, a coil spring connected at its ends to the arbor and barrel, means adapted to be driven by the unwinding of the spring, and winding means comprising a gear in connection with one end of the spring, a winding shaft, a pinion gear thereon, an intermediate gear meshing with the first gear and the pinion gear, and being of greater diameter than the pinion gear and of smaller diameter than the first gear, a ratchet on the winding shaft, and a pawl engaging the ratchet adapted to resist movement of the winding shaft in unwinding direction.

22. In a motor, a frame, a non-rotatable shaft supported at its ends by the frame, a spring arbor sleeve rotatably mounted thereon and of single spring length, a second spring arbor sleeve rotatably mounted thereon and of double spring length, and a third spring arbor sleeve rotatably mounted thereon and of single spring length, two spring barrels, each of double spring length, rotatably disposed about the shaft, a coil spring connected at its inner end to the first spring arbor, and at its outer end to the first barrel, a second coil spring connected at its outer end to the first barrel, and at its inner end to the second spring arbor, a third coil spring connected at its inner end to the second spring arbor, and at its outer end to the second barrel, a fourth coil spring connected at its outer end to the second barrel, and at its inner end to the third spring arbor, means connected to the third spring arbor adapted to be driven by the unwinding of the springs, and winding means connected to the first spring arbor.

23. In a motor, a frame, power spring means adapted to be driven by the unwinding of the spring, and means for winding the spring including a winding shaft, a ratchet on the shaft, an open-slotted member having frictional movement with the shaft, a pivoted pawl adapted to be engaged with and disengaged from the ratchet, and having connection with said member whereby movement of the shaft in winding direction disengages the pawl from the ratchet, and movement in unwinding direction engages the pawl with the ratchet to prevent such movement.

24. In a motor, a frame, power spring means adapted to be driven by the unwinding of the spring, and means for winding the spring including a winding shaft, a ratchet on the shaft, a member rotatably mounted upon the shaft, having frictional movement therewith, and having a forked projecting portion, a pivoted pawl adapted to be engaged with and disengaged from the ratchet, and having a projection engaging the forked projecting portion of the member whereby movement of the shaft in winding direction disengages the pawl from the ratchet, and movement in unwinding direction engages the pawl with the ratchet to prevent such movement.

25. In a motor, a frame, power spring means adapted to be driven by the unwinding of the spring, and means for winding the spring including a winding shaft, a ratchet on the shaft, a member rotatably mounted upon the shaft, having frictional movement therewith, and having a bifurcated projecting portion, one leg of which is shorter than the other, a pivoted pawl adapted to be engaged with and disengaged from the ratchet, and having a projection engaging the opening of the bifurcated projection whereby movement of the shaft in winding direction disengages the pawl from the ratchet, and movement in unwinding direction engages the pawl with the ratchet to prevent such movement, the engagement of the bifurcated portion with the projection of the pawl adapted to limit the movement of the pawl.

26. In a motor, a frame, power spring means adapted to be driven by the unwinding of the spring, and means for winding the spring including a winding shaft, a ratchet on the shaft, a member rotatably mounted upon the shaft, having frictional movement therewith, and having a bifurcated projecting portion, one leg of which is shorter than the other, lugs at the end of the leg portions substantially at right angles to the plane of rotation of the member, a pivoted pawl adapted to be engaged with and disengaged from the ratchet, and having a projection engaged between said lugs whereby movement of the shaft in winding direction disengages the pawl from the ratchet, and movement in unwinding direction engages the pawl with the ratchet to prevent such movement.

27. In a motor, a frame, power spring means adapted to be driven by the unwinding of the spring, and means for winding the spring including a winding shaft, a ratchet mounted upon the shaft, an open slotted member rotatably mounted upon the shaft adjacent the ratchet, a coil spring mounted upon the shaft and adapted to frictionally engage the member with the ratchet, a pivoted pawl adapted to be engaged with and disengaged from the ratchet, and having connection with the member whereby movement of the shaft in winding direction disengages the pawl from the ratchet, and movement in unwinding direction engages the pawl with the ratchet to prevent such movement.

28. In a motor, a frame, a non-rotatable shaft supported at its ends by the frame, a spring arbor sleeve rotatably mounted thereon, a spring barrel mounted upon the arbor, a coil spring connected at its inner and outer ends respectively to the arbor and the barrel, a second spring arbor sleeve rotatably mounted upon the shaft, a second coil spring connected at its outer end to the barrel and at its inner end to the second arbor, the adjacent ends of the arbors being beveled to form an annular channel, a spring separator plate having a central perforation rotatably engaging the channel, means connected to one of the arbors adapted to be driven by the unwinding of the spring, and winding means connected to the other arbor.

29. In a motor, a frame, a non-rotatable shaft supported at its ends by the frame, a spring arbor sleeve rotatably mounted thereon, a spring barrel mounted upon the arbor, a coil spring connected at its inner and outer ends respectively to the arbor and the barrel, a second spring arbor sleeve rotatably mounted upon the shaft, a second coil spring connected at its outer end to the barrel, and at its inner end to the second arbor, the adjacent ends of the arbors being cut away at their upper and lower surfaces to permit access of lubricant between the bores of the arbors and the non-rotatable shaft, means connected to one of the arbors to be driven by the unwinding of the spring, and winding means connected to the other arbor.

30. In a motor, a frame, a non-rotatable shaft supported at its ends by the frame, a spring arbor sleeve rotatably mounted thereon, a spring barrel mounted upon the arbor, a coil spring connected at its inner and outer ends, respectively, to the arbor and the barrel, means abutting one end of the arbor, such end being cut away at its upper and lower surfaces to permit access of lubricant between the bore of the arbor and the shaft.

31. In combination, a motor plate, a motor frame secured thereto and providing a space therebetween, a motor carried by the motor frame, a rotatable element driven by the motor, a traveling element co-operating with the rotating element and permanently carried by the motor plate, and a start-and-stop means mounted in the space between the motor plate and the motor frame, and adapted to co-operate with the motor to start and stop it.

32. In combination, a motor plate, a motor frame secured thereto and providing a space therebetween, a motor carried by the motor frame, a rotatable element driven by the motor, a traveling element co-operating with the rotating element and carried by the motor plate, and start-and-stop means pivotally mounted upon the motor frame in a space between the motor plate and the motor frame, and adapted to co-operate with the motor to start and stop it.

33. In combination, a motor plate, a motor frame secured thereto and providing a space therebetween, a motor carried by the motor frame, a rotatable element driven by the motor, a traveling element co-operating with the rotating element and carried by the motor plate, start-and-stop means for the motor, and speed-regulating means mounted in the space between the motor plate and the motor frame, and adapted to co-operate with the motor to regulate its speed.

34. In combination, a motor plate formed of sheet metal, and having a plurality of reinforcing ribs pressed therein in intersecting relation to each other, and a motor frame secured to the motor plate and insulating means between the motor and the motor frame, 35. In combination, a motor plate formed of sheet metal, and having a plurality of reinforcing ribs pressed therein in intersecting and parallel relation to each other, and a motor frame secured to the motor plate and insulating means between the motor and the motor frame.

36. The method of standardizing spring motor construction, comprising assembling the parts for a single and double spring unit, and various combinations thereof, in multiple in a frame adapted to receive them.

37. The method of making a three-spring motor, comprising assembling the parts of a single and a double spring unit on a shaft journaled in a frame adapted to receive them, and connecting the two spring units.

38. In a motor, a metal motor plate having longitudinal and transverse reinforcing ribs extending at right angles to each other, and a motor unit having three point suspension from the plate, along lines passing between the points intersecting the ribs.

39. In a motor, a shaft mounting comprising a bearing at one end, and another bearing at the other end, which consists of a rotatably adjustable member having an eccentrically disposed longitudinally adjustable journal bearing.

40. In a motor, a shaft mounting comprising a bearing at one end, and another bearing at the other end, which consists of a rotatably adjustable member having an eccentrically disposed longitudinally adjustable journal bearing, and means for fixing the bearings in their adjusted position.

41. In a motor, a shaft mounting comprising bearings at each end, consisting of rotatably adjustable bushings having eccentrically disposed journal bearings annularly journaling the ends of the shaft, and longitudinally adjustable thrust bearings mounted in the bushings and engaging the ends of the shaft.

42. In a motor, a winding shaft, a ratchet on the shaft, a pawl adapted to be engaged with the ratchet to prevent unwinding, and means adapted to hold the pawl disengaged from the ratchet during winding.

43. In a spring motor, silent winding means, including a ratchet, a pawl adapted to engage the ratchet through the force of the motor spring, and means for holding the pawl out of engagement during winding.

44. In a motor, including a frame and a plurality of shafts journaled therein, bearings for the shafts, an oil reservoir, and oil conduits, adapted to distribute oil from the reservoir to the shafts at points close to but outside of the several bearings.

45. The combination in a motor of a frame, a spring shaft supported by the frame, power spring means supported upon the shaft, a gear connected to the power spring means and adapted to be driven thereby, a shaft adapted to support an article to be rotated, an intermediate shaft between the spring shaft and said last-named shaft and adapted to be driven by said gear, and a governor, the governor, the intermediate shaft, and the spring shaft being disposed in parallel relation.

46. The combination in a motor of a frame, a horizontal spring shaft supported by the frame, power spring means supported upon the shaft, a gear connected to the power spring means and adapted to be driven thereby, a vertical shaft, a horizontal intermediate shaft between the spring shaft and said last-named shaft and adapted to be driven by said gear, a horizontal governor shaft and a governor carried thereby, the governor shaft, the intermediate shaft, and the spring shaft being disposed in parallel relation.

47. In a motor, a shaft bearing comprising a bushing adjustable to vary the position of a shaft supported therein transversely of its axis, and means for positively and independently varying the position of the shaft longitudinally of its axis.

48. In a motor, a shaft bearing comprising a rotatably mounted bushing having an eccentric bore to vary the position of a shaft supported therein transversely of its axis, and means for positively and independently varying the position of the shaft longitudinally of its axis.

49. In a motor, a shaft bearing comprising a bushing adjustable to vary the position of a shaft supported therein transversely of its axis, and a thrust bearing rotatably mounted in said bushing and adapted to be adjusted longitudinally of the bushing to vary the position of the shaft longitudinally of its axis, and independently of the transverse adjustment.

50. In a motor, a support, a shaft bearing comprising a bushing having an eccentric bore and being threaded exteriorly to engage a support, the flange at one end of said bushing, a nut engaging the other threaded end to secure the bushing in the support, the bushing adapted to be adjusted to vary the position of the shaft supported therein transversely of its axis, a thrust bearing having threaded engagement with the bore of the bushing and adapted to vary the position of the shaft longitudinally of its axis, and a nut engaging the projecting threaded portion of the thrust bearing and adapted to fix it with relation to the bushing.

51. In a motor, a frame, a motor unit supported thereby, and a sheet-metal supporting plate for the motor frame, said plate having ribs formed therein both for strengthening the plate and eliminating the vibrations.

52. In a motor, a frame, a motor unit supported thereby, and an anti-vibration-transmitting, sheet-metal supporting plate for the motor frame.

53. In a motor, a frame, a motor unit supported thereby, and flat supporting means for the motor frame, said means having ribs formed therein both for strengthening the plate and eliminating the vibrations.

54. In a motor, a frame, a motor unit supported thereby, and a supporting plate for the motor frame, having its surface broken-up into unequal areas.

55. In a device of the character described, an integral, vertically disposed frame, a spring motor, its horizontally disposed shaft mounted in the frame, a vertically disposed driven shaft mounted in the frame and a governor shaft also mounted in the frame.

56. In combination, a motor plate, a motor frame secured thereto and providing a space therebetween, a motor carried by the motor frame, a rotatable element driven by the motor, and a start-and-stop means mounted in the space betwen the motor plate and the motor frame, and adapted to co-operate with the motor to start and stop it.

57. In combination, a motor plate, a motor frame secured thereto and providing a space therebetween, a motor carried by the motor frame, a rotatable element driven by the motor, and start-and-stop means pivotally mounted upon the motor frame in a space between the motor plate and the motor frame, and adapted to co-operate with the motor to start and stop it.

58. In combination, a motor plate, a motor frame secured thereto and providing a space therebetween, a motor carried by the motor frame, a rotatable element driven by the motor, start-and-stop means for the motor, and speed-regulating means mounted in the space between the motor plate and the motor frame, and adapted to co-operate with the motor to regulate its speed.

59. The combination with a spring motor, a casing, a coiled spring connected at one end to the casing, a winding means including a winding shaft, a ratchet on the winding shaft, a pawl to engage the ratchet to prevent unwinding, and means adapted to hold the pawl disengaged from the ratchet during winding, and said coiled spring connected at its other end with the winding means.

Signed at Bridgeport, in the county of Fairfield and State of Connecticut, this 3rd day of May A. D. 1921.

THEODORE C. ROBERTS.